United States Patent
Hogan et al.

(10) Patent No.: US 10,705,992 B2
(45) Date of Patent: Jul. 7, 2020

(54) NON-DISRUPTIVE ENCODING OF SOURCE DATA IN A SOURCE DATA SET MIGRATED TO A TARGET DATA SET

(71) Applicant: International Business Machines Corporation, Armonk, NY (US)

(72) Inventors: John H. Hogan, Los Angeles, CA (US); Richard G. Pace, Simi Valley, CA (US); Harry M. Yudenfriend, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 7 days.

(21) Appl. No.: 15/838,325

(22) Filed: Dec. 11, 2017

(65) Prior Publication Data
US 2019/0179782 A1 Jun. 13, 2019

(51) Int. Cl.
*G06F 13/20* (2006.01)
*G06F 16/25* (2019.01)
*G06F 3/06* (2006.01)

(52) U.S. Cl.
CPC .......... *G06F 13/20* (2013.01); *G06F 3/0601* (2013.01); *G06F 16/258* (2019.01); *G06F 2213/0056* (2013.01)

(58) Field of Classification Search
CPC .......... G06F 13/20; G06F 3/64; G06F 3/0608; G06F 3/0601; G06F 3/0683; G06F 3/0647; G06F 2213/0056; G06F 16/258
See application file for complete search history.

(56) References Cited

U.S. PATENT DOCUMENTS

| | | | |
|---|---|---|---|
| 7,386,552 B2 | 6/2008 | Kitamura et al. | |
| 8,117,413 B2 | 2/2012 | Pace | |
| 8,117,443 B1 | 2/2012 | Waldo et al. | |
| 8,966,283 B1 * | 2/2015 | Shankar | G06F 21/602 |
| | | | 713/191 |
| 9,582,524 B1 * | 2/2017 | Murali | G06F 16/214 |
| 9,720,991 B2 * | 8/2017 | Kritchko | G06F 16/27 |
| 9,805,071 B1 * | 10/2017 | Ellis | G06F 16/214 |
| 2014/0281064 A1 * | 9/2014 | Imazaki | G06F 13/20 |
| | | | 710/74 |

(Continued)

OTHER PUBLICATIONS

Jin et al., "Live Virtual Machine Migration with Adaptive Memory Compression" dated 2009, Proceedings of the 2009 IEEE International Conference on Cluster Computing (Cluster 2009), (Related) Total 10 pages.

(Continued)

*Primary Examiner* — Nimesh G Patel
(74) *Attorney, Agent, or Firm* — David W. Victor; Konrad Raynes Davda & Victor LLP

(57) ABSTRACT

Provided are a computer program product, system, and method for non-disruptive encoding of source data in a source data set migrated to a target data set. The source data in the source data set is migrated to a target data set by encoding the source data to produce encoded source data to copy to a target data set. In response to receiving write data for the source data set, the write data is encoded to produce encoded write data to copy to the target data set. Input/Output ("I/O") requests to the source data set are redirected to the target data set having encoded data for the source data set.

24 Claims, 8 Drawing Sheets

(56) References Cited

U.S. PATENT DOCUMENTS

2015/0370505 A1* 12/2015 Shuma ................ G06F 3/0647
                                                    711/165
2018/0032280 A1*  2/2018 Feigin ................ G06F 3/0647
2018/0225288 A1*  8/2018 Shivam ................ H04L 67/10
2018/0343300 A1* 11/2018 Halter ................ H04L 67/108

OTHER PUBLICATIONS

Mishima et al., "Madeus: Database Live Migration Middlewareunder Heavy Workloads for Cloud Environment", dated May 31-Jun. 4, 2015, SIGMOD'15, Melbourne, Victoria, Australia. (Related), Total 15 pages.

Svard et al., "Evaluation of Delta Compression Techniques for Efficient Live Migration of Large Virtual Machines" dated Mar. 9-11, 2011, VEE '11, Newport Beach, CA, USA (Related) Total 10 pages.

Harney et al., "The Efficacy of Live Virtual Machine Migrations Over the Internet", dated Nov. 12, 2007, VTDC'07, Reno, NV, (Background), Total 7 pages.

Rochwerger et al., "The Reservoir Model and Architecture for Open Federated Cloud Computing" dated Apr. 6, 2009, IBM Journal of Research and Development, Total 11 pages.

Krishna et al., "A Unified and Scalable Data Migration Service for the Cloud Environments," dated Dec. 9-12, 2009, 15th International Conference on Management of Data COMAD 2009, Total 4 pages.

D'Andria et al., "Data Movement in the Internet of Things Domain" dated 2015, Domain Service Oriented and Cloud Computing, vol. 9306, Lecture Notes in Computer Science (2015) (Related), Total 10 pages.

* cited by examiner

Catalog Information

Migration Encoding Information under US 10,705,992 B2

NON-DISRUPTIVE ENCODING OF SOURCE DATA IN A SOURCE DATA SET MIGRATED TO A TARGET DATA SET

BACKGROUND OF THE INVENTION

1. Field of the Invention

The present invention relates to a computer program product, system, and method for non-disruptive encoding of source data in a source data set migrated to a target data set.

2. Description of the Related Art

Data storage customers often want to encrypt their data to protect and secure from unauthorized and malicious access. Customers may also want to compress their data to reduce storage space to save on storage costs and to improve network transmission times by transmitting compressed data. Compressing and encrypting large databases, files, and data sets can take considerable time and require exclusive access to the data during which the customers and users may not have access to the data.

There is a need in the art for improved techniques for transforming data, such as compressing and encrypting data.

SUMMARY

Provided are a computer program product, system, and method for non-disruptive encoding of source data in a source data set migrated to a target data set. The source data in the source data set is migrated to a target data set by encoding the source data to produce encoded source data to copy to a target data set. In response to receiving write data for the source data set, the write data is encoded to produce encoded write data to copy to the target data set. Input/Output ("I/O") requests to the source data set are redirected to the target data set having encoded data for the source data set.

DETAILED DESCRIPTION

The process to compress and/or encrypt a large data set takes considerable time, and may involve operations to backup the data before the compression or encryption, delete the old data, allocate new encrypted capable data sets and then generate encrypted or compressed data from the backup (or the old data). Customers would have to stop application access to the data subject to these compression and encryption operations, copy the data to the new data sets, restart the application, and delete the old data sets. In order to accomplish these compression and encryption operations, organizations schedule application outages while the affected data undergoes compression/encryption. Additionally, organizations that have 24/7 or near 24/7 operations do not have a sufficient window to perform these compression/encryption operations while maintaining data availability.

The described embodiments provide improvements to computer technology for encoding data sets, such as compressing or encrypting, by providing a methodology that performs the encoding while allowing users continued access to the data set so as not to disrupt access during the encoding. Described embodiments allow continued access while encoding the source data by encoding and migrating source data in the source data set to the target data set and encoding received write data to copy to the target data set. After, migrating the source data set and copying the encoded write data, I/O requests to the source data set are redirected to the target data set having encoded data for the source data set without writing to the source data set. Further, the metadata for the target data set is updated to use a source data set identifier to refer to the target data set having the encoded data. Applications use the updated metadata to direct I/O requests for the source data set directly to the target data set having the encoded source data. Described embodiments allow users to continue to access the source data set during these different phases of the encoding and migration process.

Described embodiments further provide improved data structures to manage the migration and encoding of a source data set to migrate the encoded source data to the target data set while users and applications continue to access source data in the source data set for normal operations.

Figure 1:
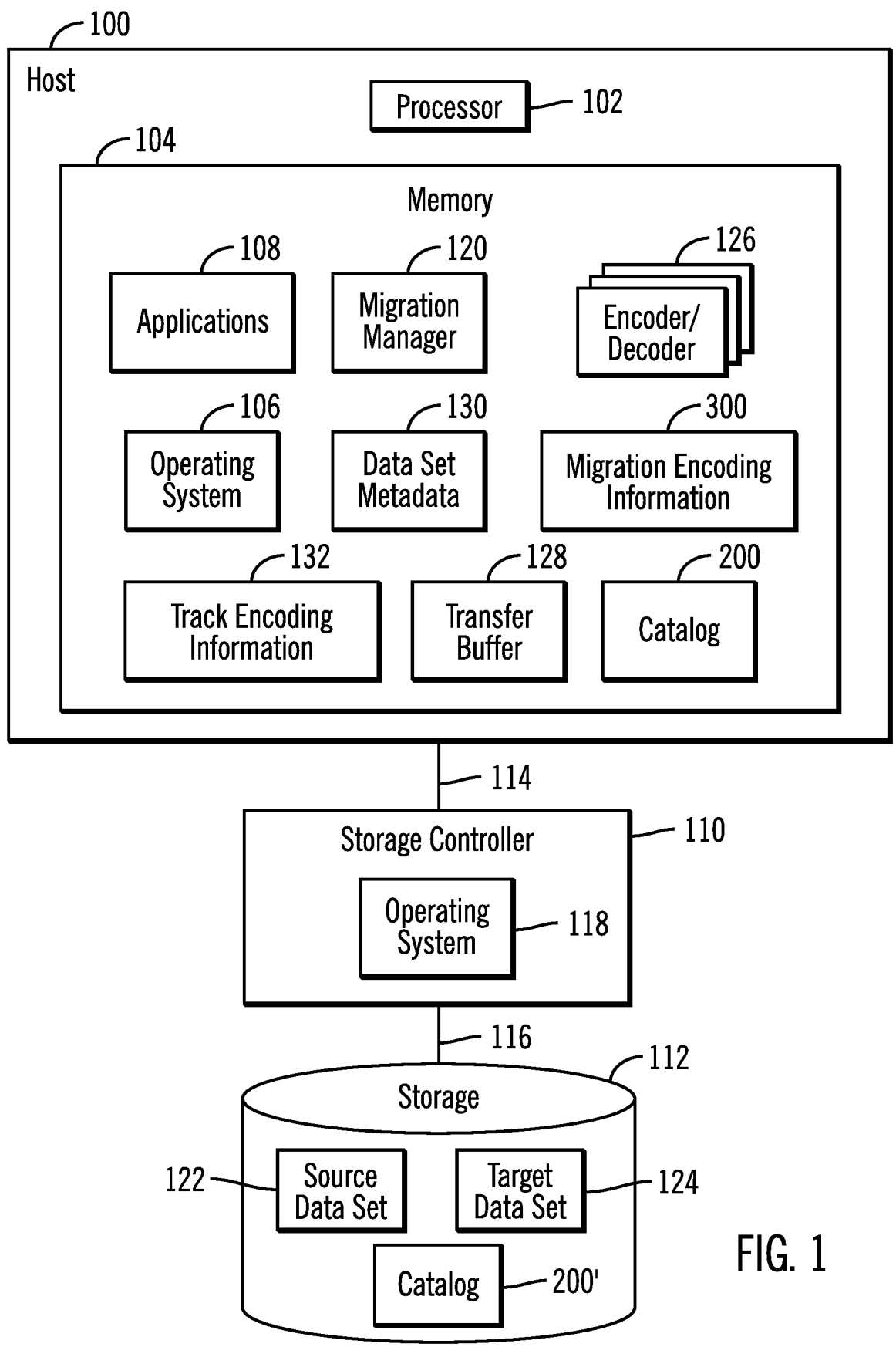
FIG. 1 illustrates an embodiment of a storage environment.

FIG. 1 illustrates an embodiment of a data storage environment having a host system 100 that includes a processor 102 and memory 104 storing programs executed by the processor 102, including an operating system 106 to transmit read and write requests from applications 108, executing in the host 100 or another system connected to the host 100, to a storage controller 110 to process with respect to data in a storage 112. The storage controller 110 manages access to the storage 112. The host 100 may communicate with the storage controller 110 over a link 114, such as a network, bus interface, cable, etc. The storage controller 110 communicates over a link 116 to the storage 112, such as a network, bus interface, cable, etc. The storage controller 110 includes an operating system 118 to manage Input/Output (I/O) requests from one or more hosts 100.

The host memory 104 further includes a migration manager 120 to manage the migration of source data in a source data set 122 to a target data set 124 in the storage 112. The migration manager 120 would intercept reads and writes from the application 108 directed to the operating system 106 to process for migration encoding, and then forward to the operating system 106 to transfer to the storage controller 110. The host memory 104 includes one or more encoder/decoder programs 126, such as an compression program, encryption program, or other program that converts source data in the source data set 122 from one format to another format to store in the target data set 124 for purposes of security, standardization, speed, save space, etc. The encoded source data is not stored in the source data set 122, but only the target data set 124. The encoder/decoder 126 may copy the source data from the source data set 122 into a transfer buffer 128 in the memory 104 to encode and convert to another format before transferring to the target data set 124 to store. The migration manager 120 may transfer encoded data from the target data set 124 into the transfer buffer 128 for the encoder/decoder 126 to decode, and then the migration manager 120 may return the decoded data to a read request from a host application 108.

The source 122 and target 124 data sets may reside in the same or different n storages managed by the same or different storage controllers. Catalog 200' metadata that resides with both the source 122 and target 1244 data sets (although not part of the data sets themselves), other catalog data may reside in a storage controller separate from either the source or target data set.

The host memory 104 further stores migration encoding information 300 providing information on source data sets 122 being subject to a migration encoding procedure. The applications 108 maintain application data set metadata 130 providing metadata on data sets allocated to the application 108. The applications 108 use the metadata 130 to access the data set through the storage controller 110, such as access information on the data set to use for read and write operations. The memory 104 also stores track encoding information 132 indicating whether tracks or ranges or groups of tracks allocated to a data set are to be encoded, e.g., compressed, encrypted, etc. The track encoding information 132 may indicate that some or all of the tracks in the data set are to be encoded, and may specify the encoding method to use for all tracks or specific tracks to allow for different or multiple encoding methods for tracks in the data set. The track encoding information 132 may be implemented in system managed storage definitions, security definitions, migration control cards, etc.

The host operating system 106 maintains a catalog 200 having information on data sets configured in the storage 112, such as the source 122 and target 124 data sets. Certain data set specific catalog information 200; may be written by the host 100 to the storage 112. A data set may comprise a portion of a logical storage device or volume, such as a range of tracks, database blocks, etc., and may be comprised of smaller units of data, such as extents, tracks, etc., that are allocated to data sets or files.

The storage 112 may comprise different types or classes of storage devices, such as magnetic hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. The data sets 122, 124 may further be configured from an array of devices, such as Just a Bunch of Disks (JBOD), Direct Access Storage Device (DASD), Redundant Array of Independent Disks (RAID) array, virtualization device, etc. Further, the storages 112 may comprise heterogeneous storage devices from different vendors and different types of storage devices.

The links 114, 116 may comprise a storage network such as one or more interconnected Local Area Networks (LAN), Storage Area Networks (SAN), Wide Area Network (WAN), peer-to-peer network, wireless network, etc.

Figure 2:
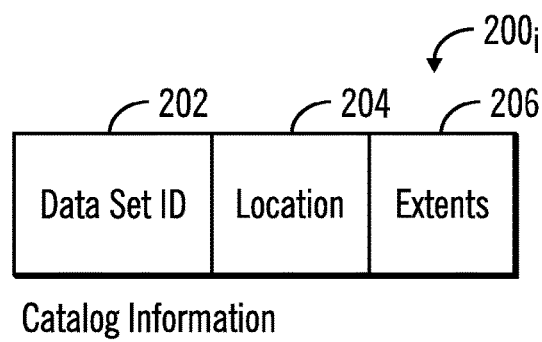
FIG. 2 illustrates an embodiment of catalog information for a data set.

FIG. 2 shows an embodiment of an instance of catalog information $200_i$ in the catalog for a data set configured in the storage 112, and includes a data set identifier (ID) 202, e.g., name of the data set, or file; a location 204 of the data set, such as a set of volumes, physical storage location, etc.; extents 206 allocated to the data set 202.

Figure 3:
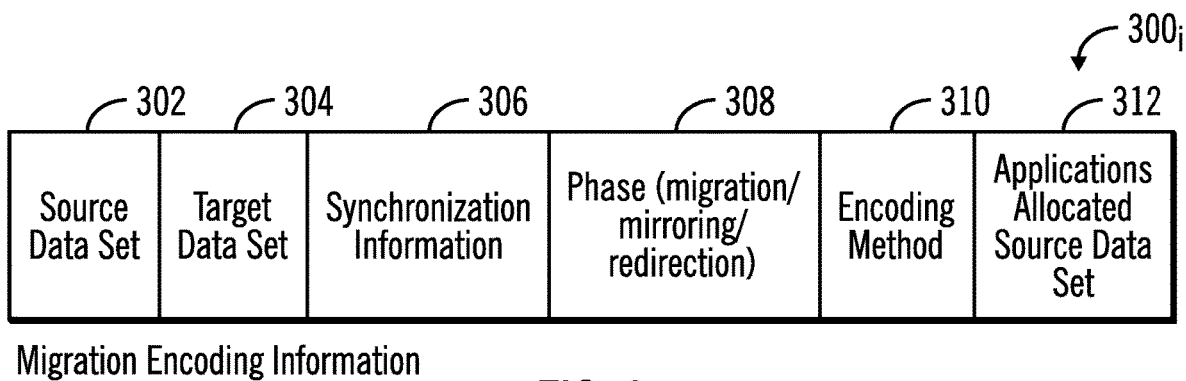
FIG. 3 illustrates an embodiment of migration encoding information for a source data set to encode.

FIG. 3 illustrates an embodiment of an instance of migration encoding information $300_i$ the migration manager 120 generates to manage the migration of a source data set 122 to a target data set 124 for purposes of compressing and/or encrypting the source data set 122 while allowing applications 108 continued access to the source data set 122 while the source data is being encoded. The migration encoding information $300_i$ may indicate the source data set 302, such as a name or identifier of the source data set 122 of source data to encode and migrate; a target data set 304, such as a name or identifier of the target data set 124, to which the encoded source data is migrated; synchronization information 306 indicating source data, such as source tracks, that need to be copied to the target data set 304 to synchronize the source data set 302 and target data set 304, such as a bitmap having a bit for each source data unit or track that needs to be copied; a phase 308 of the migration, such as migration, mirroring, and redirection; an encoding method 310 indicating one or more encoder/decoder programs 126 to use to encode the source data; and applications allocated the source data set 312, which are applications 108 accessing the source data set 302 when the migration encoding information $300_i$ is created and during the migration.

Figure 4:
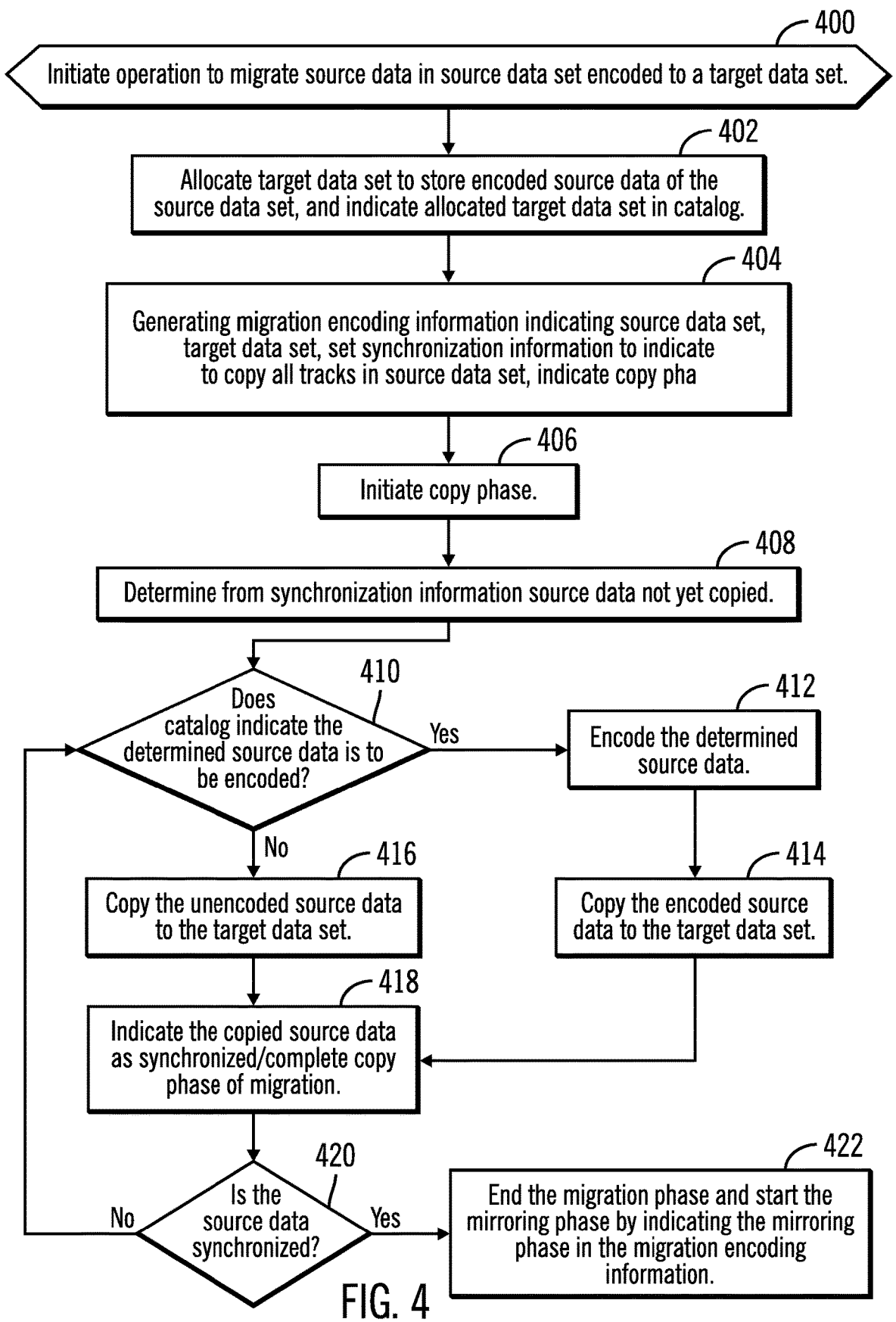
FIG. 4 illustrates an embodiment of operations to migrate source data encoded to a target data set.

FIG. 4 illustrates an embodiment of operations performed by the migration manager 120 to encode source data and copy to a target data set 124. This operation may be initiated in response to a command from an operator or automatically in response to an event or condition. Upon initiating (at block 400) an operation to encode a source data set 122, the migration manager 120 allocates (at block 402) a target data set 124, having a sufficient size, to store the encoded source data, and indicate the allocated target data set 124 in catalog information $200_i$. The migration manager 120 generates (at block 404) migration encoding information $300_i$ indicating the source data set 302; target data set 304; synchronization information 306, such as a bitmap, to indicate to copy all tracks in source data set 302; a phase 308 initialized to migration; one or more encoding methods 310 to use to encode the source data 302, e.g., compression, encryption, etc.; and current applications allocated the source data set 312, i.e., currently accessing data in the source data set 312. The current allocations 312 may be updated during the migration if an application 108 requests an allocation of the source data set 122 before the catalog 200 has been updated to rename the target data set 124 as the source data set 122.

During the copy phase (at block 406), the migration manager 120 determines (at block 408) from the synchronization information 306 source data not yet migrated, e.g., bits for tracks not marked as copied. If (at block 410) the catalog 200 indicates the determined source data is to be encoded, such as may be indicated by the track encoding information 132, then the migration manager 120 invokes the selected encoder/decoder 126 program to encode (at block 412) the determined source data not yet encoded in the transfer buffer 128 and copies (at block 414) the encoded source data to the target data set 124 to store, where the encoded source data is not written to the source data set 122. If (at block 410) the catalog $200_i$ for the source data set 122 indicates the determined source data is not to be encoded, such as in the track encoding information 132, then the migration manager 120 copies (at block 416) the unencoded source data to the target data set 124. The migration manager 120 forwards the unencoded or encoded source data to the operating system 106 to transfer to the storage 112 to store in the source data set 122 or target data set 124. After copying the source data at block 414 or 416, the copied source data is indicated (at block 418) in the synchronization information 306 as copied/migrated, e.g., the bit is marked as copied. If (at block 420) the source data set 122 is synchronized to the target data set 124, such as indicated in the synchronization information 306, then the migration manager 120 ends (at block 422) the copying phase and starts the mirroring phase by indicating the mirroring phase in the phase 308 field in the migration encoding information $300_i$.

With the described embodiment of FIG. 4, the encoding of the source data is initiated by copying encoded source data to the target data set 124 during the copying phase. During the copying phase, applications 108 may continue to access the source data in the source data set 122 uninterrupted.

Figure 5:
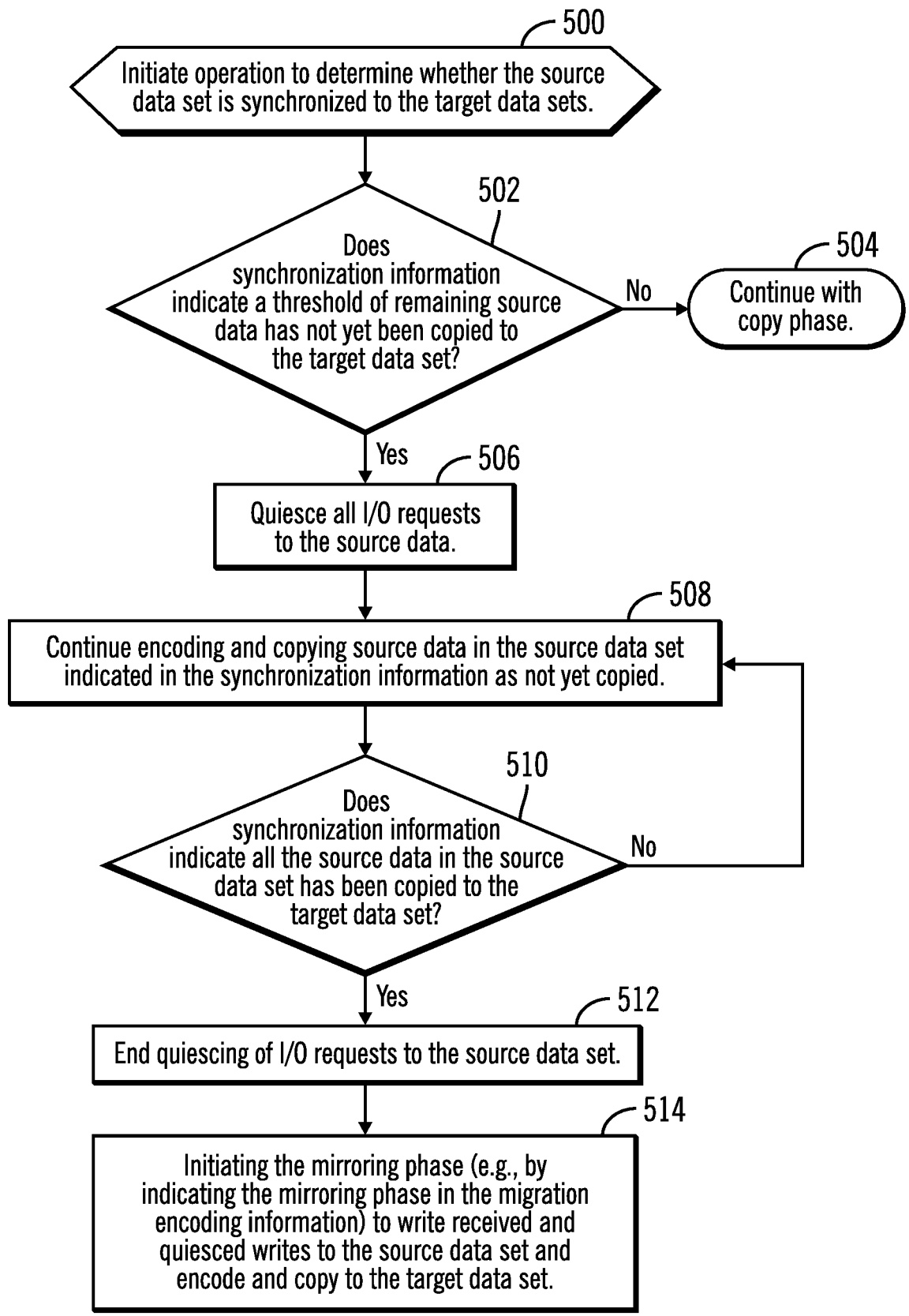
FIG. 5 illustrates an embodiment of operations to complete synchronization of the source and target data sets.

FIG. 5 illustrates an embodiment of operations performed by the migration manager 120 to complete the synchronization of the source data set 122 to the target data set 124 so that the copying phase may transition to the mirroring phase. Upon initiating (at block 500) the operation to determine whether the source data set 122 is synchronized, the migration manager 120 determines (at block 502) whether the synchronization information 306 indicates that a threshold of remaining source data has not yet been migrated to the target data set 124. If so, such as if there is a small amount of data remaining to synchronize, then the migration manager 120 may quiesce (at block 506) all application 108 I/O requests to the source data set 122 and continue (at block 508) encoding and copying source data indicated in the synchronization information 306 as not yet copied during quiescing. In this way, I/O requests are quiesced for a limited time, because there is not much source data remaining to be encoded during quiescing as indicated by the low threshold or remaining source data. If (at block 510) the synchronization information 306 indicates that all the source data has been migrated, then the quiesicing of writes is ended (at block 512) and the mirroring phase is initiated (at block 514), such as by indicating mirroring in the phase 308 field, to write received and quiesced writes to the source data set 122 and encode and copy to the target data set 124.

With the operations of FIG. 5, the mirroring phase to mirror received writes to the source data set 122 to the target data set 124 as the writes are received is initiated after the source data set 122 and target data set 124 are synchronized. All during this time that the source data set is being encoded and copied to the target data set 124, the applications 108 in hosts 100 may continue to access the source data set 122 uninterrupted.

Figure 6:
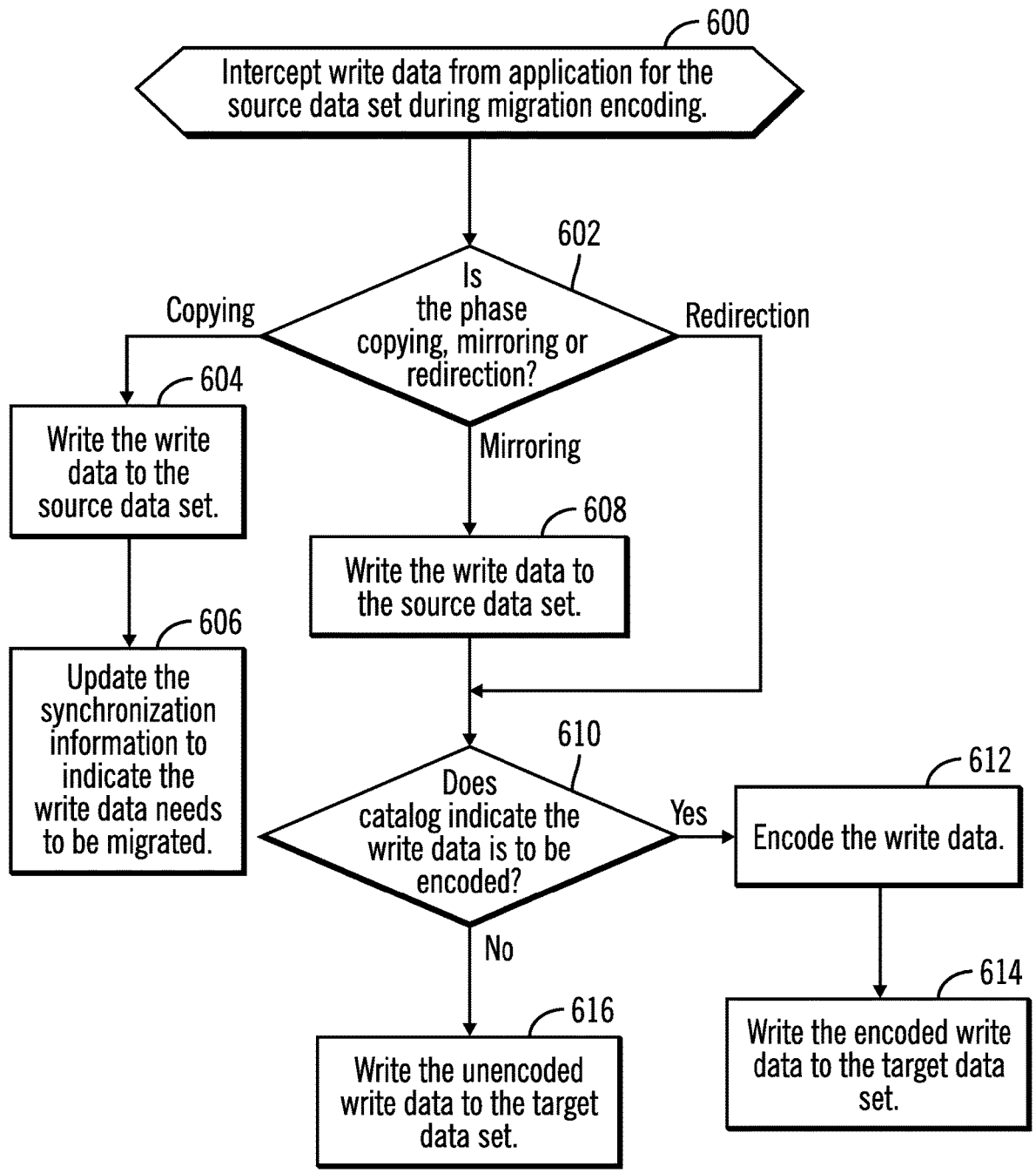
FIG. 6 illustrates an embodiment of operations to process write data to the source data set during migration encoding of the source data set.

FIG. 6 illustrates an embodiment of operations performed by the migration manager 120 to process writes from the applications 108 to the source data set 122 that are subject to migration encoding as indicated in the migration encoding information $300_i$. Upon the migration manager 120 intercepting (at block 600) write data to a source data set 122 part of migration encoding $300_i$, the migration manager 120 may determine (at block 602) the current phase 308. If (at block 602) the current phase 308 is copying, then the migration manager 120 writes (at block 604) the write data to the source data set 122, via the operating system 106, and updates (at block 606) the synchronization information 306 to indicate the write data needs to be migrated.

If (at block 602) the phase 308 indicates mirroring, then the migration manager 120 writes (at block 608) the write data to the source data set 122, via the operating system 106.

If (at block 610) the write data is to be encoded, such as by being indicated to encode in the track encoding information 132 in the catalog information $200_i$ for the source data set 122, then the write data is encoded (at block 612) and written (at block 614) to the target data set. If (at block 610) the write data is not to be encoded, then the unencoded write data is written (at block 616) to the target data set 124.

If (at block 602) the phase 308 indicates the redirection phase, then control proceeds to block 610 to redirect the write data encoded or unencoded to the target data set 124 without also writing the write data to the source data set 122.

With the embodiment of FIG. 6, write data to the source data set 122 is handled in a different manner depending on the phase. This allows the application 108 to continue to access and write to the source data set 122 while the target data set is being built to include the source data in encoded form. At the point of the redirection phase, the switch over to just using the target data set 124 as the source data is almost complete while the migration encoding process waits for allocations of the old source data set to be terminated. The migration procedure is terminated after all applications 108 currently allocated the source data set prior to migration release their allocation, and are allocated the source data set referring to the target data set 124 for further allocations to the source data.

Figure 7:
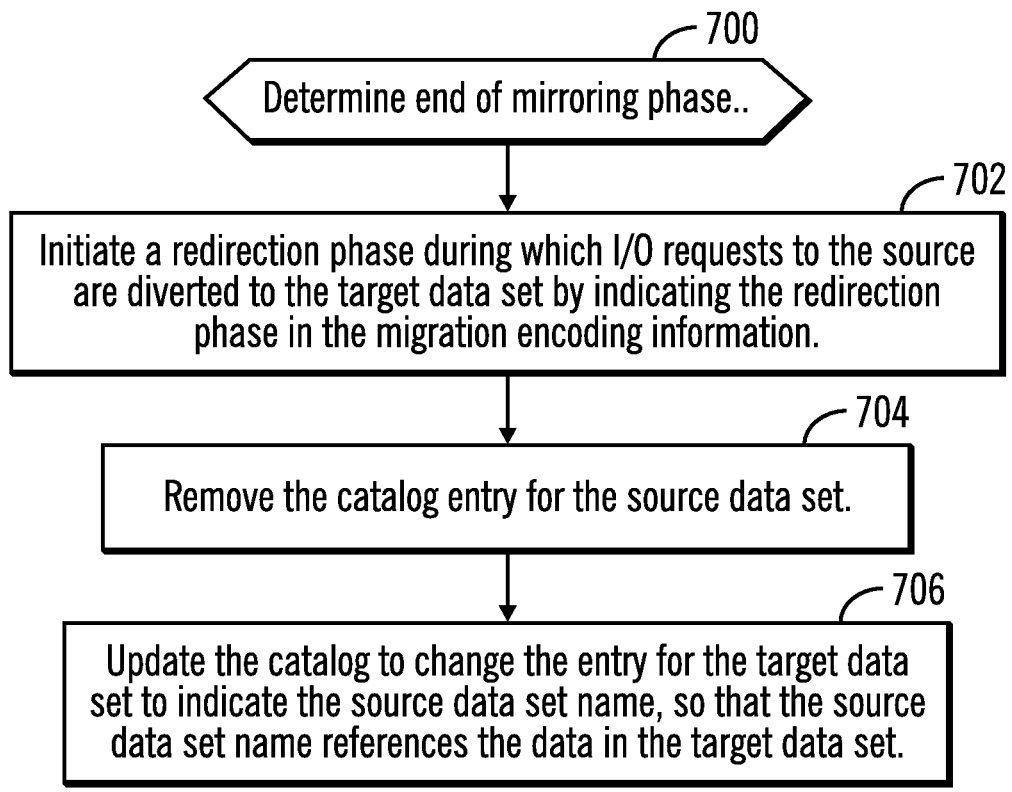
FIG. 7 illustrates an embodiment of operations to update a catalog entry for the source data set during a redirection phase.

FIG. 7 illustrates an embodiment of operations performed by the migration manager 120 to switch to the redirection phase where the final preparations are performed to prepare to have the applications 108 to switch over to directing read and writes for the source data to the target data set 124. The mirroring phase may continue until the source data set is no longer allocated, such as applications 108 releasing their allocation of the source data set 122 or if a new extent is allocated for the source data at the target data set 124 or upon a determination by the migration manager 120 to end mirroring. The migration manager 120 may determine to transition from the mirroring to redirection phase when access requests to the source data has ceased for a period. Upon determining (at block 700) to end the mirroring phase, the migration manager 120 initiates (at block 702) a redirection phase during which I/O requests to the source data are directed to the target data set 124 by indicating the redirection phase in the phase field 308 of the migration encoding information $300_i$. The catalog entry $200_S$ for the source data set 122 is removed (at block 704). The catalog 200 is updated (at block 706) to change the entry $200_T$ for the target data set 124 to indicate in field the source data set name in the data set ID 202, so that the source data set name now references the data in the target data set 124. Reads and writes may continue during the operations at blocks 702, 704, and 706.

With the operations of FIG. 7, catalog information is updated to rename the target data set 124 with the source data set name. At this point, the metadata 130 used by the applications 108 may still be directed to the old source data set, but the I/O requests directed to the old source data set are redirected to the target data set 124 until the applications 108 update their metadata 130. During this time the catalog information is updated, the applications 108 continue to have access to the source data through the redirection.

Figure 8:
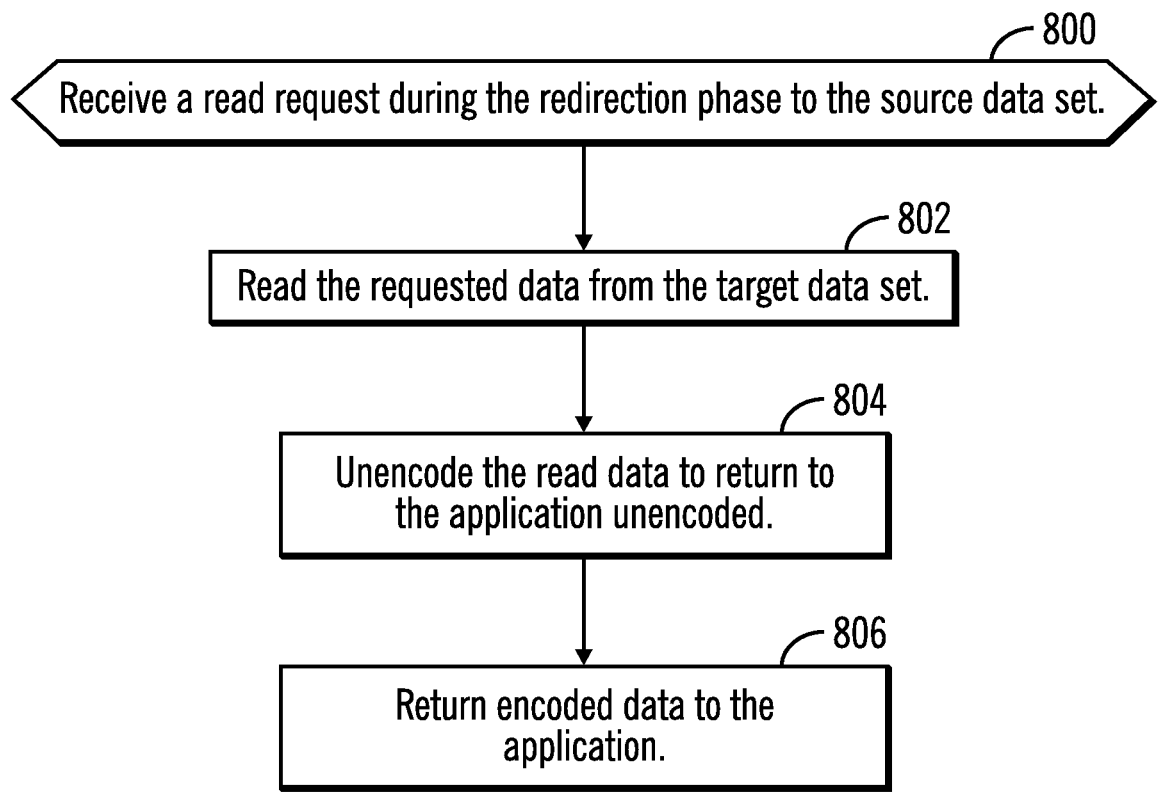
FIG. 8 illustrates an embodiment of operations to process a read request during the redirection phase.

FIG. 8 illustrates an embodiment of operations performed by the migration manager 120 to process a read request intercepted from an application 108 to the source data set 122 during the redirection phase in the migration manager 120. Upon receiving (at block 800) a read request from an application 108 during the redirection phase to the source data set 122, the migration manager 120 reads the requested data from the target data set 124, via the operating system 106. The migration manager 120 unencodes (at block 804) the read data, using the encoder/decoder 126, and returns (at block 806) the data unencoded to the application 108.

With the operations of FIG. 8, applications 108 that were allocated the source data set 122 prior to the migration, would still issue requests to the source data set 122 because the application 108 would be unaware the data set has been moved. The migration manager 120 does not need to perform redirection for applications 108 allocated the target data set 124 after the catalog 200$_i$ metadata update was complete. Applications 108 allocated the new target data set 124 using the normal services of the operating systems for encryption/decryption of the data set during read/write requests.

Further, an application 108 that allocates the source data set 122 after the migration has been initiated but before the redirection phase, is treated just like an application 108 that allocated the source data set 122 prior to initiating the migration. However, an application 108 that allocates the data set after the redirection phase will be allocating the new target data set 124, and the migration manager 120 is not involved in that application's I/O activity.

Figure 9:
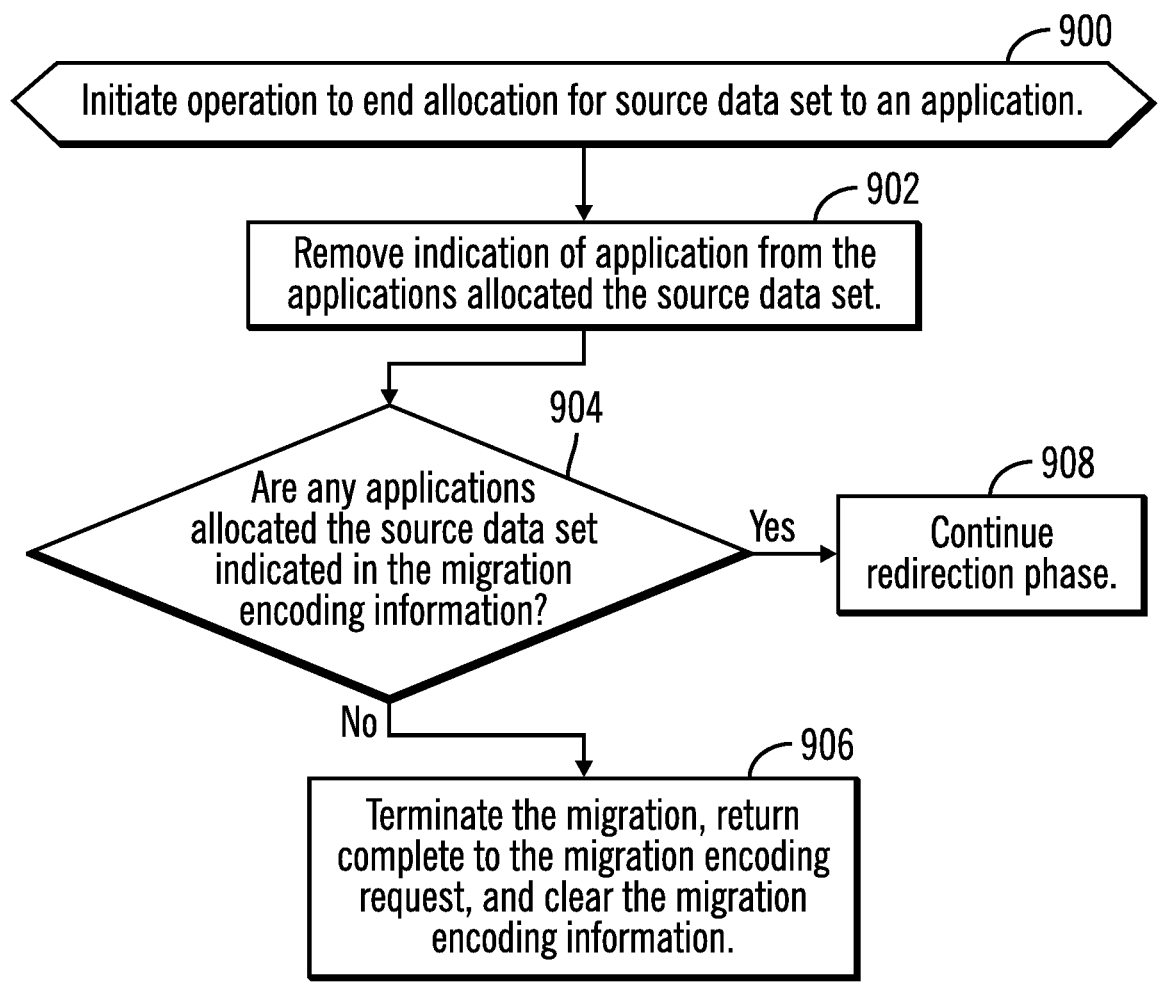
FIG. 9 illustrates an embodiment to process end of allocations of the source data set to applications and terminate migration.

FIG. 9 illustrates an embodiment of operations performed by the migration manager 120 when an application 108 ends its allocation to the source data set 122. This may occur if an application 108 ends access to the source data set, if the application closes and then reopens access to the source data set or when extents are added to the target data set 124 to increase space when an end of volume condition occurs at the target data set 124. These events cause the updating of the application data set metadata 130 with the new source data set info referencing the target data set 124. Upon initiating (at block 900) an operation to end allocation of the source data set 122 to an application 108, the migration manager 120 removes (at block 902) indication of the application 108 from the applications allocated the source data set 312 in the migration encoding information 300$_i$. If (at block 904) there are no applications allocated the source data set 312, then the migration is terminated (at block 906), complete is returned to the migration encoding request, and the migration encoding information 300$_i$ may be cleared. If (from the yes branch of block 904) there are still applications 108 allocated the source data set 122, then the redirection phase continues until all allocations to the source data set 122 are terminated.

With the embodiments of FIG. 9, the migration is completed when all the allocations of the old source data set 122 have ended. During this time, the applications 108 allocated the source data set 122 continue to have access to the source data in the target data set 124.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
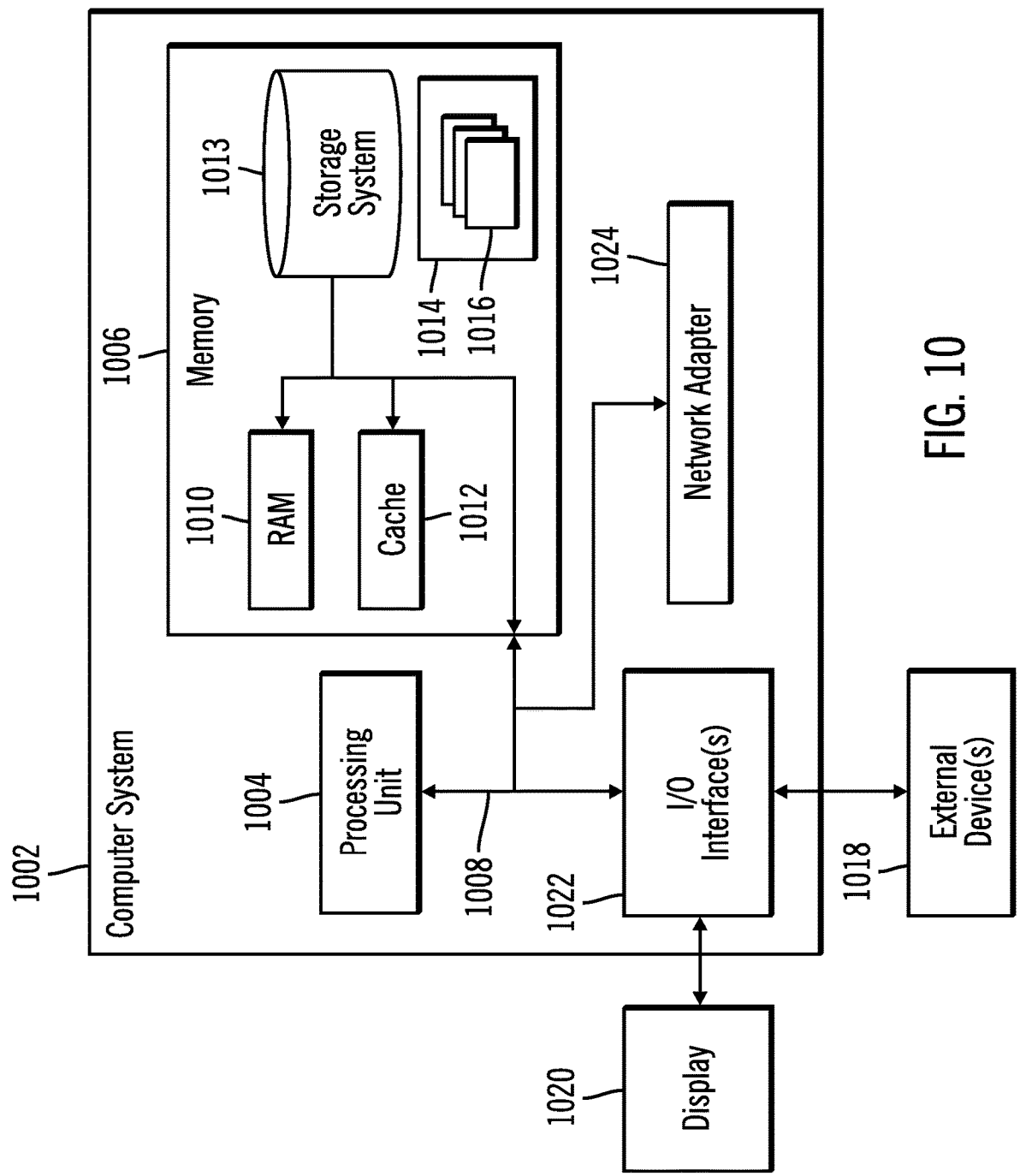
FIG. 10 illustrates a computing environment in which the components of FIG. 1 may be implemented.

The computational components of FIG. 1, including the host 100 and the storage controller 110 may be implemented in one or more computer systems, such as the computer system 1002 shown in FIG. 10. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer 1002 may be implemented as program modules 1016 which generally carry out the functions and/or methodologies of embodiments of the invention as described herein. The systems of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for encoding source data for a source data set being accessed by an application, the computer program product comprising a computer readable storage medium having computer readable program code embodied therein that is executable to perform operations, the operations comprising:

determining whether the source data in the source data set to migrate is to be encoded;

encoding the source data to migrate to produce encoded source data in response to determining that the source data to migrate is to be encoded;

copying the encoded source data to a target data set where the target data set is allocated from storage with a sufficient size to store the encoded source data, wherein the source data stored in the source data set is unencoded when the encoded source data is copied to the target data set to store and the encoded source data is not stored in the source data set;

migrating the source data to migrate unencoded to store in the target data set unencoded in response to determining that the source data to migrate is not to be encoded;

in response to receiving write data for the source data set, writing the write data to the source data set, encoding the write data to produce encoded write data, and copying the encoded write data to the target data set; and redirecting Input/Output ("I/O") requests for source data from the source data set to the target data set having encoded data for the source data set.

2. The computer program product of claim 1, wherein the operations further comprise:

updating metadata to have a source data set identifier refer to the target data set, wherein after the updating metadata, applications use the metadata to direct I/O requests for the source data set directly to the target data set having the encoded source data.

3. The computer program product of claim 1, wherein the application continues to access the source data in the source data set during the migrating the source data, the encoding the write data, and the redirecting I/O requests to the source data.

4. The computer program product of claim 1, wherein the encoding the source data set comprises at least one of compressing and encrypting data in the source data set.

5. The computer program product of claim 1, wherein the encoding the source data comprises:

processing metadata for the source data to determine whether source data in the source data set is to be encoded, wherein the source data is encoded and copied to the target data set in response to determining that the metadata indicates the source data is to be encoded; and copying the source data unencoded to the target data set in response to determining that the metadata indicates the source data is to not be encoded.

6. The computer program product of claim 1, wherein the operations further comprise:

in response to the source data set synchronized with the target data set, performing:

terminating the migrating the source data from the source data set; and initiating a mirroring phase to encode the write data to copy to the target data set.

7. The computer program product of claim 6, wherein the operations further comprise:

quiescing I/O requests to the source data set in response to reaching a threshold of remaining data in the source data set not yet encoded and copied to the target data set;

in response to quiescing the I/O requests, performing:

encoding any source data in the source data set not yet copied to the target data set; and copying the encoded source data to the target data set, wherein the source data set is synchronized in response to all the source data in the source data set encoded and copied to the target data set; and encoding quiesced write data and copying the encoded quiesced write data to the target data set.

8. The computer program product of claim 6, wherein the operations further comprise:
  detecting an end of the mirroring phase;
  initiating a redirection phase during which the redirecting I/O requests to the source data set to the target data set is performed;
  updating a catalog during the redirection phase to modify a reference to the source data set to refer to the target data set; and
  updating metadata for applications from the updated catalog including the modified reference identifying the target data set as the source data set.

9. The computer program product of claim 8, wherein the operations during the redirection phase, further comprise:
  unencoding requested source data in a read request directed to the source data set to return to a requesting application that was allocated the source data set prior to initiating the migration of the source data.

10. The computer program product of claim 8, wherein the operations further comprise:
  terminating the redirection phase in response to no applications allocated the source data that was allocated before the updating of the catalog.

11. The computer program product of claim 8, wherein the operations further comprise:
  closing, by an application, the source data set that was allocated before updating the catalog; and
  reopening the source data set, by the application closing the source data set, to receive the updated metadata to access the source data set that references the target data set having the encoded source data.

12. The computer program product of claim 1, wherein the operations further comprise:
  allocating additional storage space to the target data set for the source data; and
  indicating the allocated additional storage space in catalog information for the target data set, wherein applications accessing the source data set receive updated metadata with a source data set identifier referencing the target data set in response allocating the additional storage space to the target data set.

13. A system for encoding source data for a source data set being accessed by an application, comprising:
  a processor; and
  a computer readable storage medium having computer readable program code embodied therein that is executable to perform operations, the operations comprising:
    determining whether the source data in the source data set to migrate is to be encoded;
    encoding the source data to migrate to produce encoded source data in response to determining that the source data to migrate is to be encoded;
    copying the encoded source data to a target data set where the target data set is allocated from storage with sufficient size to store the encoded source data, wherein the source data stored in the source data set is unencoded when the encoded source data is copied to the target data set to store and the encoded source data is not stored in the source data set;
    migrating the source data to migrate unencoded to store in the target data set unencoded in response to determining that the source data to migrate is not to be encoded;
    in response to receiving write data for the source data set, encoding the write data to produce encoded write data, writing the write data to the source data set, and copying the encoded write data to the target data set; and
    redirecting Input/Output ("I/O") requests to the source data set to the target data set having the encoded source data for the source data set.

14. The system of claim 13, wherein the operations further comprise:
  updating metadata to have a source data set identifier refer to the target data set, wherein after updating metadata, applications use the metadata to direct I/O requests for the source data set directly to the target data set having the encoded source data.

15. The system of claim 13, wherein the operations further comprise:
  in response to the source data set synchronized with the target data set, performing:
    terminating the migrating the source data from the source data set; and
    initiating a mirroring phase to encode the write data to copy to the target data set.

16. The system of claim 15, wherein the operations further comprise:
  quiescing I/O requests to the source data set in response to reaching a threshold of remaining data in the source data set not yet encoded and copied to the target data set;
  in response to quiescing the I/O requests, performing:
    encoding any source data in the source data set not yet copied to the target data set; and
    copying the encoded source data to the target data set, wherein the source data set is synchronized in response to all the source data in the source data set encoded and copied to the target data set; and
  encoding quiesced write data and copying the encoded quiesced write data to the target data set.

17. The system of claim 15, wherein the operations further comprise:
  detecting an end of the mirroring phase;
  initiating a redirection phase during which the redirecting I/O requests to the source data set to the target data set is performed; and
  updating a catalog during the redirection phase to modify a reference to the source data set to refer to the target data set; and
  updating metadata for applications from the updated catalog including the modified reference identifying the target data set as the source data set.

18. The system of claim 17, wherein the operations further comprise:
  terminating the redirection phase in response to no applications allocated the source data that was allocated before the updating of the catalog.

19. A method for encoding source data for a source data set being accessed by an application, comprising:
  determining whether the source data in the source data set to migrate is to be encoded;
  encoding the source data to migrate to produce encoded source data in response to determining that the source data to migrate is to be encoded;
  copying the encoded source data to a target data set, where the target data set is allocated from storage to have a sufficient size to store the encoded source data, wherein the source data stored in the source data set is unencoded when the encoded source data is copied to the target data set to store and the encoded source data is not stored in the source data set;

migrating the source data to migrate unencoded to store in the target data set unencoded in response to determining that the source data to migrate is not to be encoded;

in response to receiving write data for the source data set, encoding the write data to produce encoded write data, writing the write data to the source data set, and copying the encoded write data to the target data set; and redirecting Input/Output ("I/O") requests to the source data set to the target data set having encoded source data for the source data set.

20. The method of claim 19, further comprising:

updating metadata to have a source data set identifier refer to the target data set, wherein after the updating metadata, applications use the metadata to direct I/O requests for the source data set directly to the target data set having the encoded source data.

21. The method of claim 19, further comprising:

in response to the source data set synchronized with the target data set, performing:
  terminating the migrating the source data from the source data set; and
  initiating a mirroring phase to encode the write data to copy to the target data set.

22. The method of claim 21, further comprising:

quiescing I/O requests to the source data set in response to reaching a threshold of remaining data in the source data set not yet encoded and copied to the target data set;

in response to quiescing the I/O requests, performing:
  encoding any source data in the source data set not yet copied to the target data set; and
  copying the encoded source data to the target data set, wherein the source data set is synchronized in response to all the source data in the source data set encoded and copied to the target data set; and encoding quiesced write data and copying the encoded quiesced write data to the target data set.

23. The method of claim 21, further comprising:

detecting an end of the mirroring phase;

initiating a redirection phase during which the redirecting of the I/O requests to the source data set to the target data set is performed;

updating a catalog during the redirection phase to modify a reference to the source data set to refer to the target data set; and updating metadata for applications from the updated catalog including the modified reference identifying the target data set as the source data set.

24. The method of claim 23, further comprising:

terminating the redirection phase in response to no applications allocated the source data that was allocated before the updating of the catalog.

* * * * *